3,050,484
BITUMINOUS PROTECTIVE COATING AND
METHOD OF USE
James Q. Wood, Bartlesville, Okla., assignor to Phillips
Petroleum Company, a corporation of Delaware
No Drawing. Filed Mar. 28, 1960, Ser. No. 17,762
10 Claims. (Cl. 260—28.5)

This invention relates to an improved bituminous protective coating composition. In another aspect this invention relates to an asphaltic protective coating which is modified with an acrylic polymer. In still another aspect of the invention, the invention relates to a method of applying a protective coating to metal surfaces, sealing joints, seams or the like with a bituminous composition which can be cured in situ.

Bituminous compositions comprising blends of various grades of asphalt and rubbery or non-rubbery polymers have been found useful as protective coating compositions for metal surfaces. These compositions serve a dual role of protecting the metal surfaces from corrosion and, when applied in heavy coats dampen noise. These compositions have particular use at joints or seams. In one utilization of these compositions the material is applied to the metal joints of car bodies prior to painting and passing through the baking cycle for curing at elevated temperatures, for example, about 300° F. One difficulty with these coatings has been the inherent lack of coherency and poor adhesive characteristics or "tack."

According to my invention an improved bituminous protective coating composition is provided which is fluid and adhesive in its uncured state but cures to a tough, oil resistant protective coating. This composition comprises a blend of asphalt, a polymer of a conjugated diene, such as butadiene, and a polymer of acrylic acid, such as polyacrylic acid or a copolymer of acrylic acid and butadiene. In its preferred form the composition of my invention also comprises reinforcing agents of the type normally employed in rubber compounding and is cured or vulcanized by conventional methods.

It is an object of my invention to provide an improved bituminous protective coating composition which can be readily applied at normal temperatures and which will cure to a tough or resistant coating.

It is another object of my invention to provide an asphaltic sealant which will withstand relatively high temperatures yet will adhere to metal parts.

Yet another object of my invention is to provide an asphaltic protective coating composition with improved adhesion and cohesion.

It is another object of my invention to provide an asphaltic protective coating which can be applied to the metal joints of an automobile body prior to painting and cured during the normal paint baking cycle.

Still another object is to provide an improved method of applying a bituminous protective coating composition to a metallic object and subsequently curing at elevated temperatures.

Other objects, advantages and features of my invention will be apparent to those skilled in the art from the following description and claims.

The materials employed in the protective coating composition of my invention are asphalt, a polymer of a conjugated diene, and a polymer of acrylic acid. The preferred polymer of a conjugated diene is a normally liquid polymer of 1,3-butadiene. In one aspect of the invention the polymer of acrylic acid is polyacrylic acid. In another aspect of the invention the polymer of acrylic acid is a copolymer of acrylic acid and a conjugated diene such as butadiene.

The asphalts employed are those having a high ring and ball softening point (ASTM E-28-58T) for example, those softening in the range of about 140 to 275° F., generally about 150 to 250° F. Lower softening asphalts, for example, those softening at about 130 to 140° F., can be employed by increasing the amount of inert filler which tends to stiffen the asphalt and make it more resistant to flow. The asphalts which are preferred to yield a highly durable sealant are those having a ring and ball softening point in the range of about 175 to 225° F. Suitable asphaltic materials are air blown asphalt and catalyzed air blown asphalt employing such catalysts as phosphorus pentoxide and zinc chloride. Vacuum reduced virgin asphalt and naturally occurring asphalts such as Gilsonite are also suitable. Solvent extracted asphalt and cracked asphalts from cracked crude can be used, preferably when air blown. The above list is not exhaustive and other types of high softening asphalts comparable to the above-named materials as known in the art can be used.

The preferred monomers employed in the polymerization of this polymer include conjugated dienes having at least 4 carbon atoms per molecule and generally not more than 8 carbon atoms. Preferred among these is 1,3-butadiene. Other conjugated dienes such as isoprene, piperylene, methylpentadiene, 2,3-di-methyl-1,3-butadiene, chloroprene, and others, are suitable however. Various alkoxy derivatives such as methoxy and ethoxy, as well as cyano derivatives of these conjugated diolefins can also be used. More preferably the polymer is liquid polybutadiene whose formation and properties are fully described in the patent of Willie W. Crouch, Patent No. 2,631,175, issued March 10, 1953.

The amount of liquid polybutadiene or other conjugated diene which can be included in the coating composition will vary considerably depending on the properties of the asphalt as well as the properties of the polymer of acrylic acid. In general it is desirable to add from 5 to 30 weight percent liquid polybutadiene. More preferably it is desirable to add from 5 to 20 weight percent of liquid polybutadiene.

The polymer of acrylic acid used in my invention can be prepared by any suitable method. Many such methods are known in the art and their formation per se is not a part of this invention. In one aspect of the invention, the polymer of acrylic acid is polyacrylic acid having a number average molecular weight ranging from 500 to 100,000, preferably 1,000 to 20,000.[1] Molecular weight as hereinafter used refers to number average molecular weight defined in Principles of High-Polymer Theory and Practice, Schmidt and Morlies (1948), page 8. The production of polyacrylic acid suitable for this invention is well known in the art. For a fuller discussion of its chemistry see Ellis, "The Chemistry of Synthetic Resins," page 1,071.

In another aspect of the invention the polymer of acrylic acid is a copolymer of acrylic acid and a conjugated diene

[1] Assuming one double bond per molecule determined by test procedure.

having a number average molecular weight ranging from 500 to 100,000 preferably 1,000 to 20,000.[1] Preferably the conjugated diene is 1,3-butadiene. Again the copolymer may be produced by any of the known methods in the art such as the copolymerization of acrylic acid and butadiene in an acidic emulsion system in the presence of an activator such as a hydroperoxide or an alkali metal ferricyanide. The percentage of acrylic acid content should be in the range of 1 to 50 weight percent, preferably, 3 to 20 weight percent.

The amount of the polymer of acrylic acid which will be added to the composition to improve its tackiness and to reduce the crumbling of the asphalt thereby providing better flow and a more desirable coating composition will generally be in the amount of 1 to 30 weight percent of the total composition, more preferably 1 to 10 weight percent. Preferably the amount of polybutadiene and polymer of acrylic acid together will comprise not over 30 weight percent of the composition. More preferably the two polymers together will not be less than 5 nor more than 15 weight percent of the total composition. The copolymers which are preferred are butadiene/acrylic acid copolymers having an acrylic content of about 1 to 50 weight percent, preferably 3 to 20 weight percent.

Polymers as above described, particularly those in the liquid state, can be readily blended with asphalt by any conventional blending system to form a sticky protective coating composition which can be easily applied to metal surfaces and cured to a tough solid.

When compounding the composition of my invention, I prefer to employ various amounts of filler, preferably reinforcing agents normally used in rubber compounding such as carbon black and various mineral fillers, for example, silica, alumina, diatomaceous earth, and the like. An advantage of the composition herein described is its especially good adaptability with mineral reinforcing agents. Mineral fillers are, therefore, preferred for compounding these compositions. Other inert fillers such as asbestos can be employed, if desired, and such use is normally advantageous when lower melting asphalts are employed.

Other compounding ingredients such as accelerators, antioxidants, solvents, diluents, driers, vulcanizing agents, etc., may be incorporated in the composition of this invention. In the blended composition asphalt is present in a major amount, generally about 50 to 90 weight percent of the total composition. For maximum adhesive qualities and toughness of the cured product I prefer a composition having an asphalt content of about 70 to 80 weight percent. Reinforcing agents can be used in rather large quantities, broadly about 2 to 40 weight percent of the total composition being suitable. As the amount of filler is increased, the ease with which the sealant can be applied is reduced unless a more fluid or lower softening asphalt is employed. I prefer, however, to maintain the amount of inorganic filler in my composition in the range of about 2 to 15 weight percent.

Blending procedures are those employed in the art, such as mill mixing, masticating, or mixing in an internal (Banbury) mixer. The curing compounds and accelerators should be added toward the end of the mixing cycle in which elevated temperatures are used so that a minimum of precure occurs before the composition can be applied to its point of usage. These materials formulated according to this invention are fluid enough to permit application by spreading or spraying in a coarse spray upon dilution with a suitable solvent or diluent. Upon curing of the copolymer a tight bond is affected between the composition and the surface to which it is applied.

The composition of matter of this invention is normally considered to require the use of elevated temperatures to effect cure. The time required to effect cure will depend somewhat on the type of heating used and the structure to which the coating is applied. The temperature may vary from 100 to 500° F., preferably 200 to 400° F., and the time may vary inversely, though not necessarily proportionally, from 5 minutes to several hours, such as 10 hours or more. For instance, a uniform coating approximately 1/16 inch in thickness applied to a thin piece of steel by a doctor blade may be cured at approximately 300° F. in approximately 1 hour.

To further describe the composition of my invention and the method of use, the following examples of specific embodiments are presented. Three formulations were prepared according to the following recipes:

| | A | B | C (control) |
|---|---|---|---|
| Asphalt, grams [1] | 240 | 240 | 240 |
| Polybutadiene [2] | 30 | 45 | 60 |
| Butadiene-acrylic acid copolymer [3] | 30 | 15 | 0 |
| Carbon black | 15 | 15 | 15 |
| Zinc oxide | 3 | 3 | 3 |
| Stearic acid | 1.5 | 1.5 | 1.5 |
| Sulfur | 1.2 | 1.2 | 1.2 |
| Tetramethyl thiuram disulfide | 0.6 | 0.6 | 0.6 |
| Phenylbetanaphthylamine | 0.3 | 0.3 | 0.3 |
| Mineral spirits | 150 | 150 | 150 |

[1] Steep roofing asphalt (air blown, softening point 195–200° F.) ASTM E-28-58T.
[2] Saybolt-Furol viscosity—2500 seconds @100° F. (ASTM D-88-56).
[3] 0.063 acid equivalents per 100 grams, 260 poise viscosity, 1400 number average molecular weight, 4.5 weight percent bound acrylic acid.

Each of the above formulations was applied to separate, clean, 20 gauge steel by means of a doctor blade to produce a uniform wet coating thickness of 1/16 inch. In each of the above formulations, the material was a thick paste at room temperature. The coated steel panels were simultaneously cured 1 hour at 300° F. The protective coating was fluid during the first part of the cure period but, upon the evaporation of the solvents and diluents, and curing of the components, it changed to a solid by the end of the cure time. These coated panels were then exposed in an Atlas weatherometer type XW [2] for 1,280 hours at about 16 hours intervals over a total period of approximately 5 months. The weatherometer operated with 3 minutes' water spray for every 20 minutes with a maximum temperature of 160° F. Upon final removal from the weatherometer the weathered samples were bent over a 1″ mandrel to check brittleness. Formulation A had the best adhesion after weathering. Formulations A and B were devoid of surface cracks while control formulation C was badly cracked.

It can be readily seen from the above runs that the use of a polymer of acrylic acid, such as butadiene/acrylic acid copolymer, does improve the resistance of a bituminous protective coating to accelerated weathering.

Although this invention has been described by certain examples and by the use of specific illustrations, it is understood that these are not to be considered as limiting the scope of the invention. Many modifications are possible by those skilled in the art within the scope of the invention.

What I claim is:

1. A bituminous coating composition comprising a normally liquid polymerized conjugated diene having from 4 to 8 carbon atoms per molecule, a polymer of acrylic acid selected from the group consisting of polyacrylic acid and a copolymer of acrylic acid and a conjugated diene having from 4 to 8 carbon atoms per molecule, and from 50 to 90 weight percent asphalt.

2. The composition of claim 1 wherein said conjugated diene comprises butadiene.

3. A bituminous protective coating composition comprising liquid polybutadiene, reinforcing agents, a polymer of acrylic acid selected from the group consisting of polyacrylic acid and a copolymer of acrylic acid and butadiene and from 50 to 90 weight percent high softening asphalt.

[2] Manufactured by: Atlas Electric Devices Company, 4114 North Ravenswood Avenue, Chicago 13, Illinois. Described at: Modern Plastics Encyclopedia Issue for 1959, 36, No. 1A 960.

4. A bituminous coating composition comprising from 50 to 90 weight percent asphalt, from 5 to 30 weight percent of a normally liquid polymerized conjugated diene having from 4 to 8 carbon atoms per molecule and from 1 to 30 weight percent of a polymer of acrylic acid selected from the group consisting of polyacrylic acid and a copolymer of acrylic acid and a conjugated diene having from 4 to 8 carbon atoms per molecule.

5. A bituminous protective coating composition comprising from 50 to 90 weight percent high softening asphalt, from 5 to 30 weight percent liquid polybutadiene, from 2 to 40 weight percent reinforcing agent, selected from the group consisting of carbon black and mineral filler, and from 1 to 30 weight percent polyacrylic acid.

6. A bituminous protective coating composition comprising from 50 to 90 weight percent high softening asphalt, from 5 to 30 weight percent liquid polybutadiene, from 2 to 40 weight percent reinforcing agent selected from the group consisting of carbon black and mineral filler, and from 1 to 30 weight percent copolymer of acrylic acid and butadiene.

7. A bituminous protective coating composition comprising from about 70 to 80 weight percent high softening asphalt, from 5 to 20 weight percent liquid polybutadiene, from about 2 to 15 weight percent reinforcing agent selected from the group consisting of carbon black and mineral filler, from 1 to 10 weight percent polyacrylic acid, said liquid polybutadiene and said polyacrylic acid together being not less than 5 and not more than 15 weight percent of the total composition.

8. A bituminous protective coating composition comprising from about 70 to 80 weight percent high softening asphalt, from 5 to 20 weight percent liquid polybutadiene, from about 2 to 15 weight percent reinforcing agent selected from the group consisting of carbon black and mineral filler, from 1 to 10 weight percent copolymer of acrylic acid and butadiene, said copolymer having from 3 to 20 weight percent acrylic acid, said polybutadiene and said copolymer together being not less than 5 and not more than 15 weight percent of the total composition.

9. A method of applying a protective coating to metal surfaces which comprises forming a blend comprising 50 to 90 weight percent high softening asphalt, 2 to 40 weight percent reinforcing agent selected from the group consisting of carbon black and mineral filler, from 5 to 30 weight percent liquid polybutadiene, and 1 to 30 weight percent polymer of acrylic acid selected from the group consisting of polyacrylic acid and a copolymer of butadiene and acrylic acid, maintaining the temperature of said blend during mixing sufficiently low to prevent any appreciable curing reactions, applying said blend to a metal surface and elevating the temperature of said surface to 100 to 500° F. for a period of time sufficient to cure said blend thereon to a tough adherent protective coating.

10. The method of claim 9 wherein said elevated temperature is in the range of 200 to 400° F.

References Cited in the file of this patent
UNITED STATES PATENTS

| | | |
|---|---|---|
| 2,648,644 | McMillan et al. | Aug. 11, 1953 |
| 2,807,596 | Flickinger | Sept. 24, 1957 |